(12) United States Patent
Thurn

(10) Patent No.: US 7,593,189 B2
(45) Date of Patent: Sep. 22, 2009

(54) HEAD GIMBAL ASSEMBLY TO REDUCE SLIDER DISTORTION DUE TO THERMAL STRESS

(75) Inventor: Jeremy A. Thurn, Osseo, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 526 days.

(21) Appl. No.: 11/479,637

(22) Filed: Jun. 30, 2006

(65) Prior Publication Data

US 2008/0002299 A1    Jan. 3, 2008

(51) Int. Cl.
*G11B 5/48* (2006.01)
(52) U.S. Cl. .................................. 360/234.6
(58) Field of Classification Search ............. 360/234.3, 360/234.6, 236.5, 244.8
See application file for complete search history.

(56) References Cited

U.S. PATENT DOCUMENTS

| | | | | |
|---|---|---|---|---|
| 5,774,305 | A | 6/1998 | Boutaghou | 360/104 |
| 5,781,379 | A | 7/1998 | Erpelding et al. | 360/104 |
| 5,825,590 | A * | 10/1998 | Ohwe | 360/244.8 |
| 5,936,806 | A * | 8/1999 | Pan et al. | 360/234.6 |
| 5,955,176 | A | 9/1999 | Erpelding et al. | 428/209 |
| 6,125,015 | A | 9/2000 | Carlson et al. | 360/245.9 |
| 6,249,404 | B1 | 6/2001 | Doundakov et al. | 360/245.4 |
| 6,596,184 | B1 | 7/2003 | Shum et al. | 216/13 |
| 6,646,436 | B2 | 11/2003 | Mihara et al. | 324/212 |
| 6,669,871 | B2 | 12/2003 | Kwon et al. | 252/520.21 |
| 6,676,778 | B1 | 1/2004 | Tuchiya et al. | 156/64 |
| 7,187,514 | B2 * | 3/2007 | Takagi et al. | 360/75 |
| 2002/0177518 | A1 | 11/2002 | Kwon et al. | 501/103 |
| 2003/0042895 | A1 | 3/2003 | Mihara et al. | 324/210 |
| 2004/0079927 | A1 | 4/2004 | Kwon et al. | 252/500 |
| 2005/0270694 | A1 | 12/2005 | Umehara et al. | 360/126 |
| 2006/0002027 | A1 | 1/2006 | Kawaguchi | 360/235.1 |
| 2006/0017046 | A1 | 1/2006 | Kwon et al. | 252/511 |
| 2006/0204776 | A1 * | 9/2006 | Chen et al. | 428/616 |

FOREIGN PATENT DOCUMENTS

WO    WO 02/081402    10/2002

OTHER PUBLICATIONS

Y. Toivola et al., "Influence of Deposition Conditions on Mechanical Properties of Low-Pressure Chemical Vapor Deposited Low-Stress Silicon Nitride Films," Journal of Applied Physics, vol. 94, No. 10, Nov. 2003, pp. 6915-6922.
P.H. Townsend et al., "Elastic Relationships in Layered Composite Media with Approximation for the Case of Thin Films on a Thick Substrate," Journal of Applied Physics, vol. 62, No. 11, Apr. 1987, pp. 4438-4444.
W. Qian et al., "Crown Sensitivity of the Magnetic Recording Head Gimbal Assembly Bonded by a Viscoelastic Adhesive," Mechanics of Time-Dependent Materials, 1999, pp. 371-387.
H. Holleck, "Material Selection for Hard Coatings," Journal of Vac. Sci. Technology, vol. A4, No. 6, Nov./Dec. 1986, pp. 2661-2669.

* cited by examiner

*Primary Examiner*—Angel A. Castro
(74) *Attorney, Agent, or Firm*—Westman, Champlin & Kelly, P.A.

(57) ABSTRACT

A head gimbal assembly (HGA) is provided. The HGA includes a suspension that has a suspension coefficient of thermal expansion (CTE) and a slider that has a slider CTE. A bonding element attaches the slider to the suspension. A compensation layer, having a compensation CTE, is located on the suspension. The compensation layer serves to compensate for a thermal distortion of the slider. A method of forming a HGA is also provided. The method includes providing a suspension having a suspension CTE and forming a slider having a slider CTE. The method further includes attaching the slider to the suspension and depositing a compensation layer, having a compensation CTE, on the suspension. The compensation layer serves to compensate for a thermal distortion of the slider.

17 Claims, 7 Drawing Sheets

| MEASUREMENT NUMBER | TEMPERATURE |
|---|---|
| 1 | 25 |
| 2 | -20 |
| 3 | 70 |
| 4 | 55 |
| 5 | 35 |
| 6 | 25 |

HEAD GIMBAL ASSEMBLY TO REDUCE SLIDER DISTORTION DUE TO THERMAL STRESS

FIELD OF THE INVENTION

The present invention relates generally to a head gimbal assembly (HGA) that has a suspension for supporting a hydrodynamic air bearing slider. More specifically, the present invention relates to a suspension with an attached feature that reduces slider distortion due to thermal stress.

BACKGROUND OF THE INVENTION

Disc drives are the primary devices employed for mass storage of computer programs and data. The advantages of disc drive technology over other means of data storage include a lower cost per unit of storage capacity and a generally higher transfer rate. Within a disc drive, a suspension supports a hydrodynamic air bearing slider close to a rotating disc. The suspension supplies a downward force that counteracts the hydrodynamic lifting force developed by the slider's air bearing. The slider carries a transducer head for communication with individual bit positions on the rotating disc.

The suspension includes a load beam and a gimbal, which is attached to the load beam. The gimbal is positioned between the load beam and the slider. Typically, the gimbal is welded to the load beam and is connected to the slider by an adhesive. The gimbal resiliently supports the slider and allows it to pitch and roll while it follows the topography of the rotating disc. The slider, the suspension, and an interconnect (flexible circuit, for example, that carries electrical signals between the transducer head and drive electronics) form a head gimbal assembly (HGA).

A disc drive must operate in a wide range of ambient temperatures, where the particular temperature range depends on the product segment (for example, disc drives for the automotive market must operate in a larger temperature range than disc drives for the server market). A change in ambient temperature causes an air bearing surface (ABS) of the slider to deform due to differing thermal expansion coefficients of materials comprising the slider, the suspension, and the interconnect. The deformation of the ABS causes undesirable shifts in fly height, pitch, and roll.

Embodiments of the present invention provide solutions to these and other problems, and offer other advantages over the prior art.

SUMMARY OF THE INVENTION

A head gimbal assembly (HGA) includes a suspension that has a suspension coefficient of thermal expansion (CTE) and a slider that has a slider CTE. A bonding element attaches the slider to the suspension. A compensation layer, having a compensation CTE, is located on the suspension. The compensation layer serves to reduce a thermal distortion of the slider (or air bearing surface) by compensating for differential thermal expansion of the slider and a gimbal portion of the suspension.

A method of forming a HGA includes providing a suspension having a suspension CTE and forming a slider having a slider CTE. The method also includes attaching the slider to the suspension and depositing a compensation layer, having a compensation CTE, on the suspension. The compensation layer serves to compensate for a thermal distortion of the slider.

A HGA includes a suspension having a suspension CTE and a slider having a slider CTE. A compensation layer, located on the suspension, having a compensation CTE, is also included. The compensation CTE is less than both the suspension CTE and the slider CTE.

Other features and benefits that characterize embodiments of the present invention will be apparent upon reading the following detailed description and review of the associated drawings.

BRIEF DESCRIPTION OF THE DRAWINGS

FIGS. 3-1, 3-2 and 3-3 are simplified block diagrams that together illustrate an example method of compensating for thermal distortion in beams.

DETAILED DESCRIPTION OF ILLUSTRATIVE EMBODIMENTS

Figure 1:
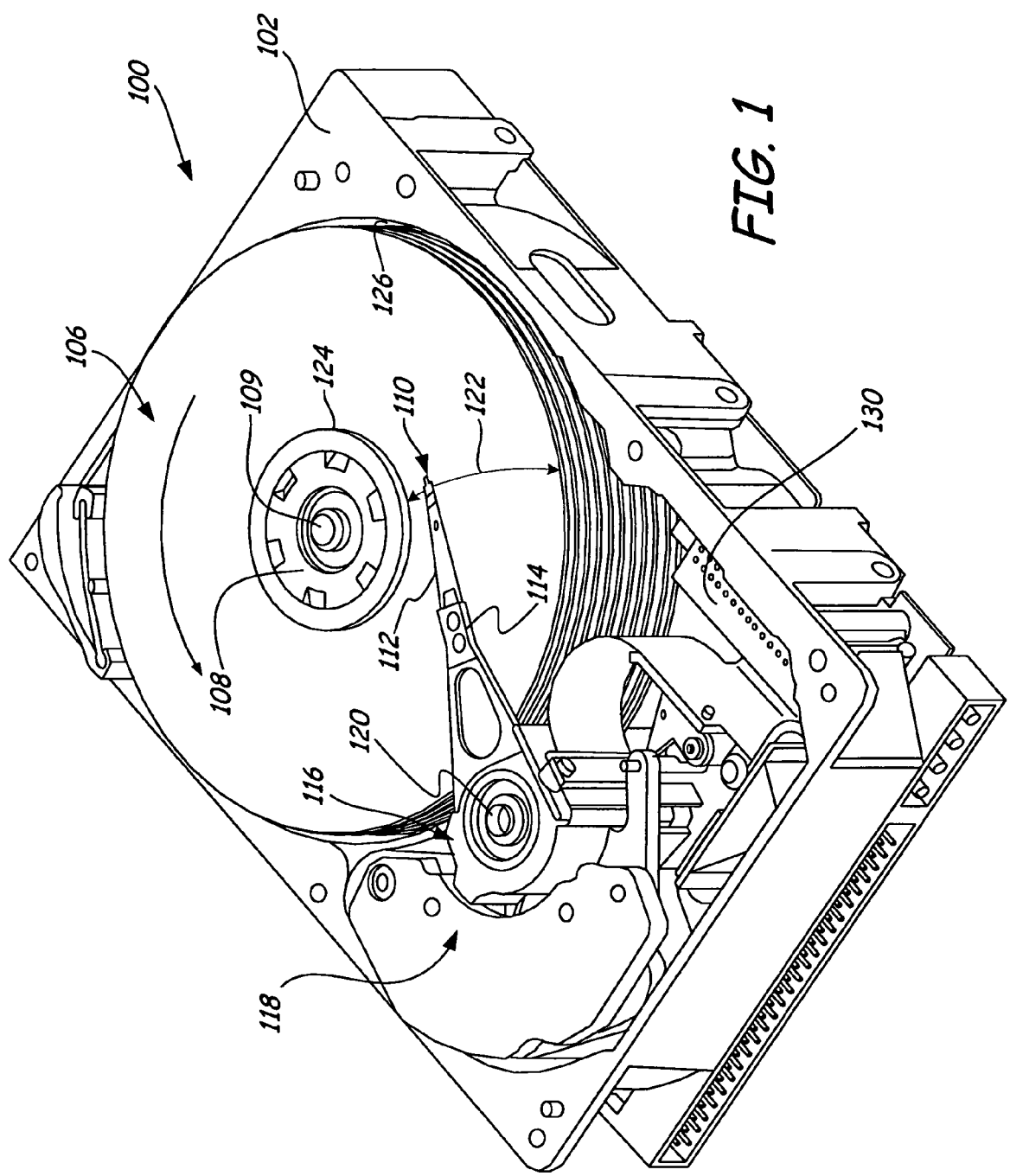
FIG. 1 is an isometric view of a disc drive.

FIG. 1 is an isometric view of a disc drive 100 in which embodiments of the present invention are useful. In the figures, like components are numbered similarly. Disc drive 100 includes a housing with a base 102 and a top cover (not shown). Disc drive 100 further includes a single disc or a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112. A suspension (such as 112), a slider (such as 110) and an interconnect (not shown in FIG. 1) together form a head gimbal assembly (HGA). The interconnect, which may be a flexible circuit, carries electrical signals between heads in slider 110 and drive electronics 130.

As can be seen in FIG. 1, suspension 112 is attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
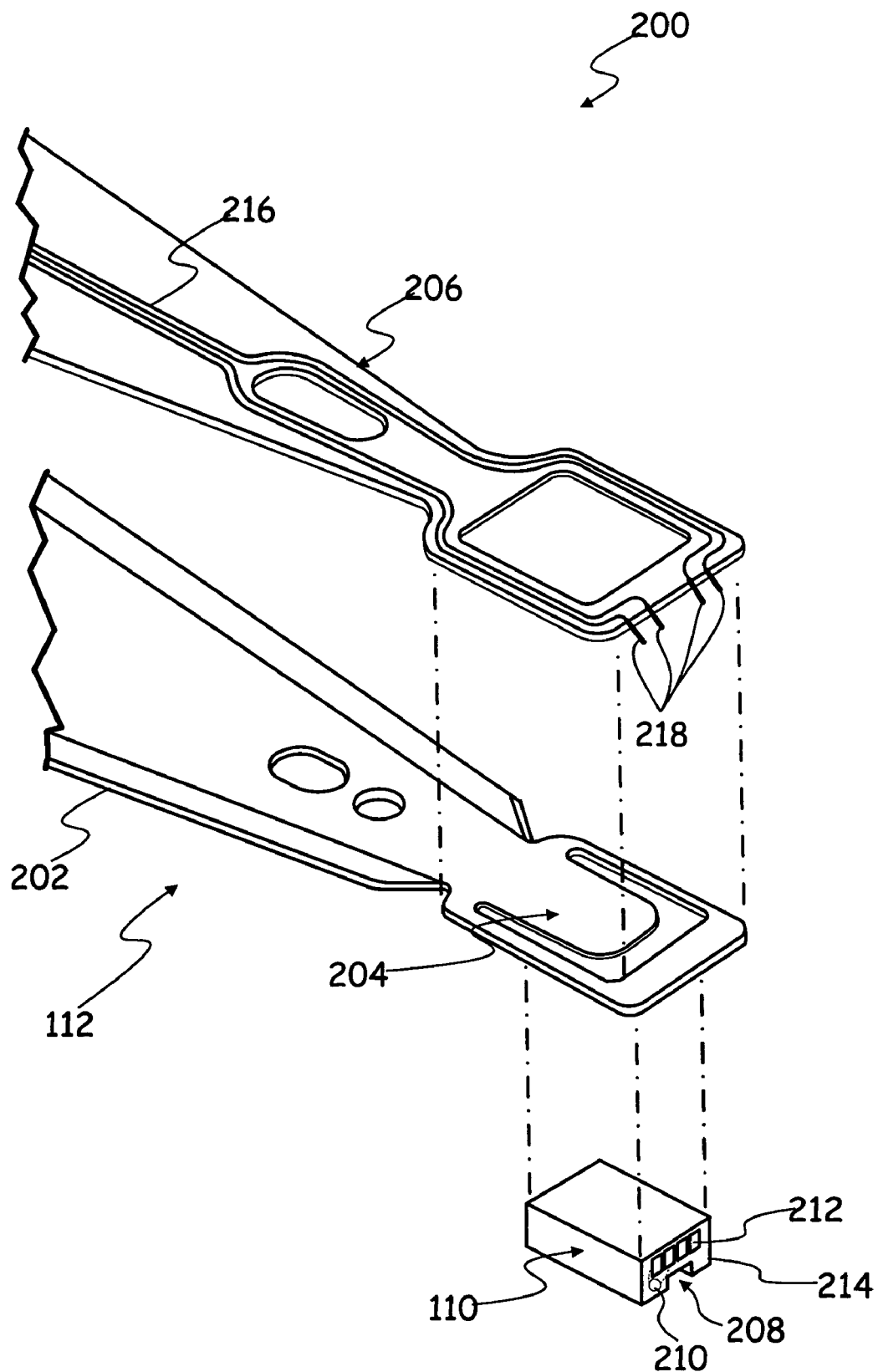
FIG. 2 is an exploded perspective view of a disc drive head gimbal assembly (HGA).

FIG. 2 is an exploded perspective view of a portion of a HGA 200 of a disc drive such as 100. FIG. 2 shows how head 110, suspension 112 (load beam portion 202 and attached gimbal 204) and interconnect 206 are assembled together. The construction shown in FIG. 2 is known as a "flex over" construction. This construction is so termed because interconnect 206 is disposed on top of (away from the disc surface) load beam 202 and gimbal 204.

Slider 110 includes air bearing surfaces (ABS) 208 which provide lift to the slider as it moves over a rotating disc. Slider 110 also includes transducer heads 210 which couple with transitions on discs 106 (FIG. 1) to retrieve data from or store data to discs 106. Transducer heads 210 are electrically coupled to bond pads 212 on trailing surface 214 of slider 110. Slider 110 mounts to gimbal 204 such that it is able to resiliently follow the topography of a disc.

FIG. 2 shows load beam 202 integral with gimbal 204. It should be noted that gimbal 204 may be separate from load beam 202 and attached thereto, by laser welding, or any other appropriate means. Gimbal 204 can be formed of steel, for example. In FIG. 2, interconnect 206 is a flexible circuit which includes circuit traces 216. Electrical conductors 216 terminate in flying leads 218 which are electrically coupled to bond pads 212 on slider 110 to electrically couple transducers 210 on slider 110 to electrical circuitry in disc drive 100 (FIG. 1).

As noted earlier, a disc drive must operate in a wide range of ambient temperatures, where the particular temperature range depends on the product segment (for example, disc drives for the automotive market must operate in a larger temperature range than disc drives for the server market). A change in ambient temperature causes the ABS of the slider to deform due to differing thermal expansion coefficients of materials comprising the slider, the suspension, and the interconnect. The deformation of the ABS causes undesirable shifts in fly height, pitch, and roll.

Figures 1, 3:
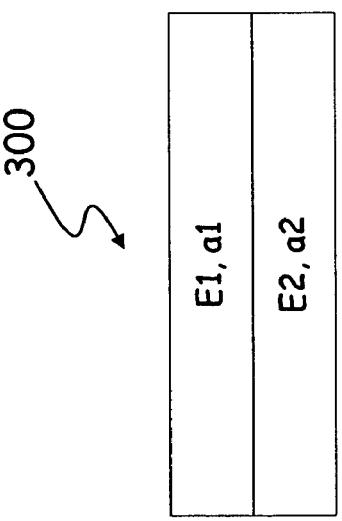
Figures 2, 3:
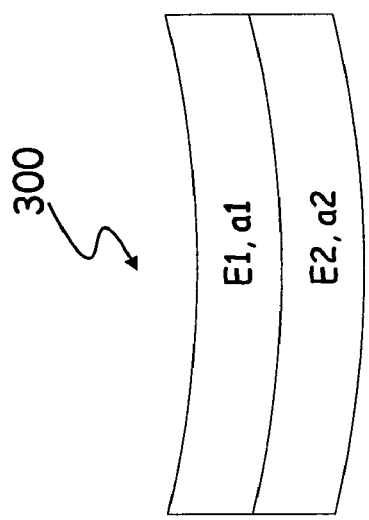
Figure 3:
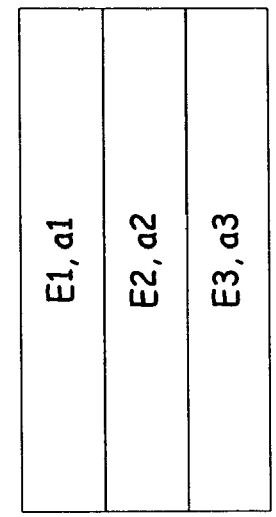

The above problem can be addressed by compensating the thermal expansion of the slider, suspension, and interconnect materials with an additional material such that a net shape change at the ABS is reduced. The concept can be described in terms of a simple bi-material thermostat 300, shown in FIG. 3-1. In FIG. 3-1, "E1" is the Young's modulus of material 1 and "a1" is the coefficient of thermal expansion (CTE) of material 1. Similarly, "E2" is the Young's modulus of material 2 and "a2" is the CTE of material 2. It should be noted that FIG. 3-1 illustrates bi-material thermostat or beam 300 when it is not in a heated condition. On heating, bi-material beam 300 curves due to a mismatch of CTEs (for example, a1 is not equal to a2). If a2 is greater than a1, the curvature at the top of material 1 is concave, as shown in FIG. 3-2. In FIG. 3-3, a third material beneath material 2 is included to form thermostat 302. "E3" is the Young's modulus of material 3 and "a3" is the CTE of material 3. If a3 is less than a2, the curvature at the top of material 1 is reduced when the system is heated as shown in FIG. 3-3. In fact, using simple mechanical modeling, a3 and E3 can be chosen such that the curvature is substantially equal to zero.

Similarly, an additional layer (referred to herein as a compensation layer) can be deposited on gimbal 204 of HGA 300 to reduce deformation at the ABS, thereby helping overcome the earlier-noted problems. The properties of the compensation layer may be optimized by use of finite element modeling of the suspension/slider/interconnect.

Figure 4:
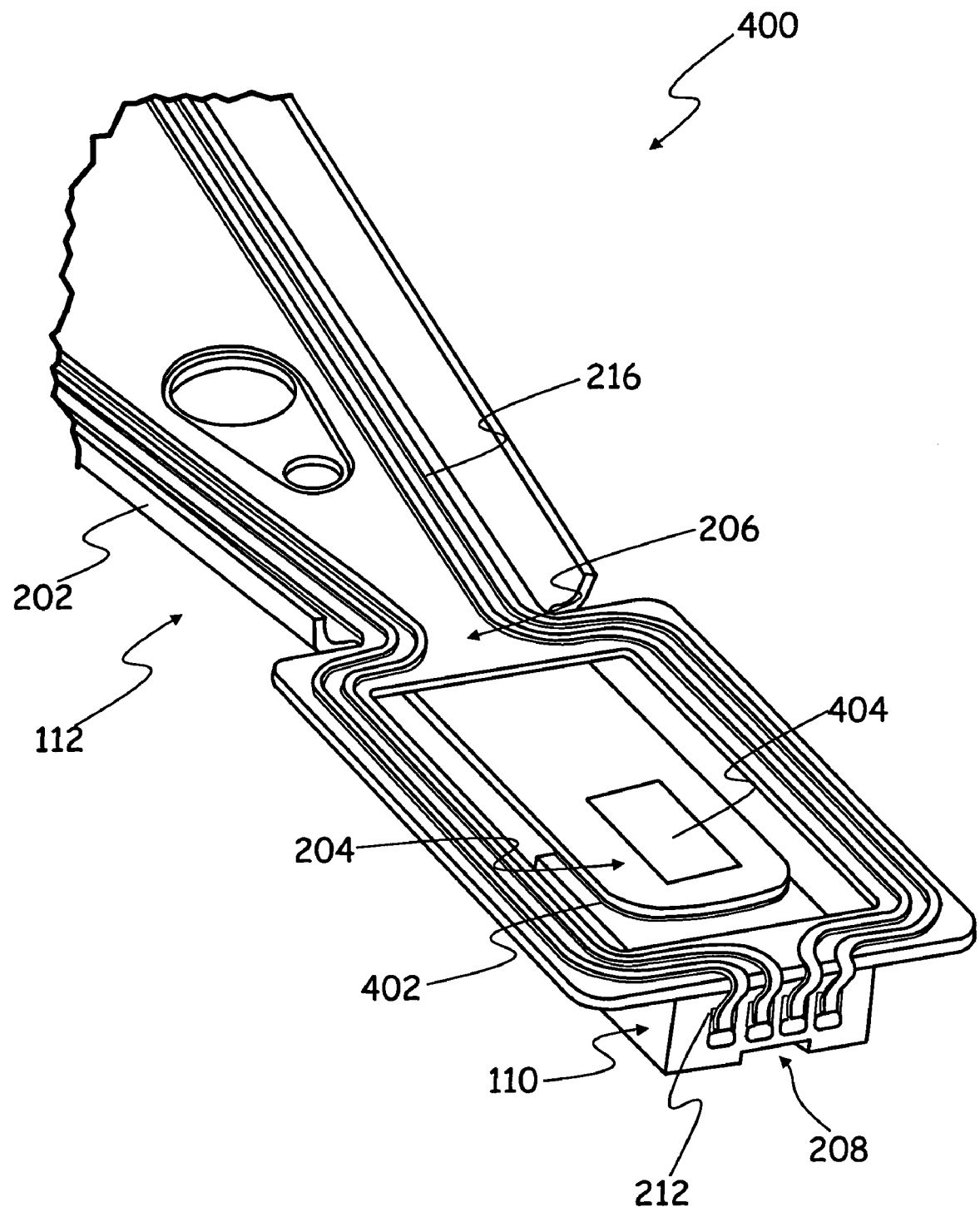
FIG. 4 is a perspective view of a HGA in accordance with one of the present embodiments.

FIG. 4 is a top perspective view of a HGA 400 in accordance with one of the present embodiments. As can be seen in FIG. 4, HGA 400 includes interconnect 206, suspension 112 and slider 110, which is attached to gimbal 204 of suspension 112 with the help of a bonding element 402. Bonding element 402 may be any suitable fastener or an adhesive layer, which can include any suitable bonding material currently known or developed in the future. In some embodiments, multiple bonding elements 402 (adhesive layer and ball bonds, for example) may be used to fasten slider 110, suspension 112 and interconnect 206. In accordance with the present embodiments, HGA 400 includes a compensation layer 404 that serves to compensate for a thermal distortion of slider 110. In the embodiment of FIG. 4, compensation layer 404 is on top of gimbal 204 and positioned substantially directly above (or apposite) slider 110. However, compensation layer 404 may be included in any position on top of or below suspension 112 to provide suitable compensation for slider thermal distortion. In some of the present embodiments, a CTE of a material utilized for compensation layer 404 is less than a CTE of a material of slider 110 and also less than a CTE of a material of suspension 112. In some embodiments, a CTE of a material of compensation layer 404 is between 2-5 ppm/C, a CTE of a material of slider 110 is between 6-9 ppm/C and a CTE of a material of suspension 112 is between 17-20 ppm/C.

An example compensation layer material is Silicon Carbide (SiC), which has a CTE less than steel (the suspension 112) or $Al_2O_3$—TiC (the slider 110). In one embodiment, compensation layer 404 includes about 2-5 micrometers (um) of SiC deposited by known physical vapor deposition (or sputtering) techniques on top of a steel suspension 112. In other embodiments, an approximately 2-5 um layer of Zirconium Tungstate ($ZrW_2O_8$) is utilized instead of SiC. Of course, a thickness of compensation layer 404 depends on the requirements of a particular embodiment and therefore thicknesses other than 5 um can be used. Table 1 below provides example CTE, Young's Modulus and thickness values of materials used for forming slider 110, suspension 112, bonding layer 402 and compensation layer 404 in different embodiments.

TABLE 1

| Material | Modulus (GPa) | CTE (ppm/C) | Thickness (um) |
| --- | --- | --- | --- |
| AlTiC (Slider) | 545 | 6 | 200 |
| Steel (Suspension) | 290 | 17 | 30 |
| SiC (Compensation layer) | 340 | 2 | 5 |
| Adhesive (Bonding layer) | 1 | 50 | 20 |
| $ZrW_2O_8$ (Compensation layer) | 60 | −10 | 5 |

CTE and Modulus values for other materials that may be suitable for forming compensation layer 404 are provided in Table 2 below. It should be noted that, since Modulus multiplied by thickness is equal to stiffness, in general, the higher the Modulus of the compensation layer material, the thinner the required compensation layer.

TABLE 2

| Material | Modulus (GPa) | CTE (ppm/C) |
| --- | --- | --- |
| $Si_3N_4$ | 370 | 2.2 |
| W | 400 | 4.4 |
| Ta | 180 | 4.3 |
| $SiO_2$ | 70 | 0.5 |
| Diamond | 910 | 1 |
| $Al_2TiO_5$ | 13 | 0.8 |

In general, compensation layer 404 can be formed of any material having a compensation CTE of a suitable value that serves to compensate for a thermal distortion of the slider.

Figure 5:
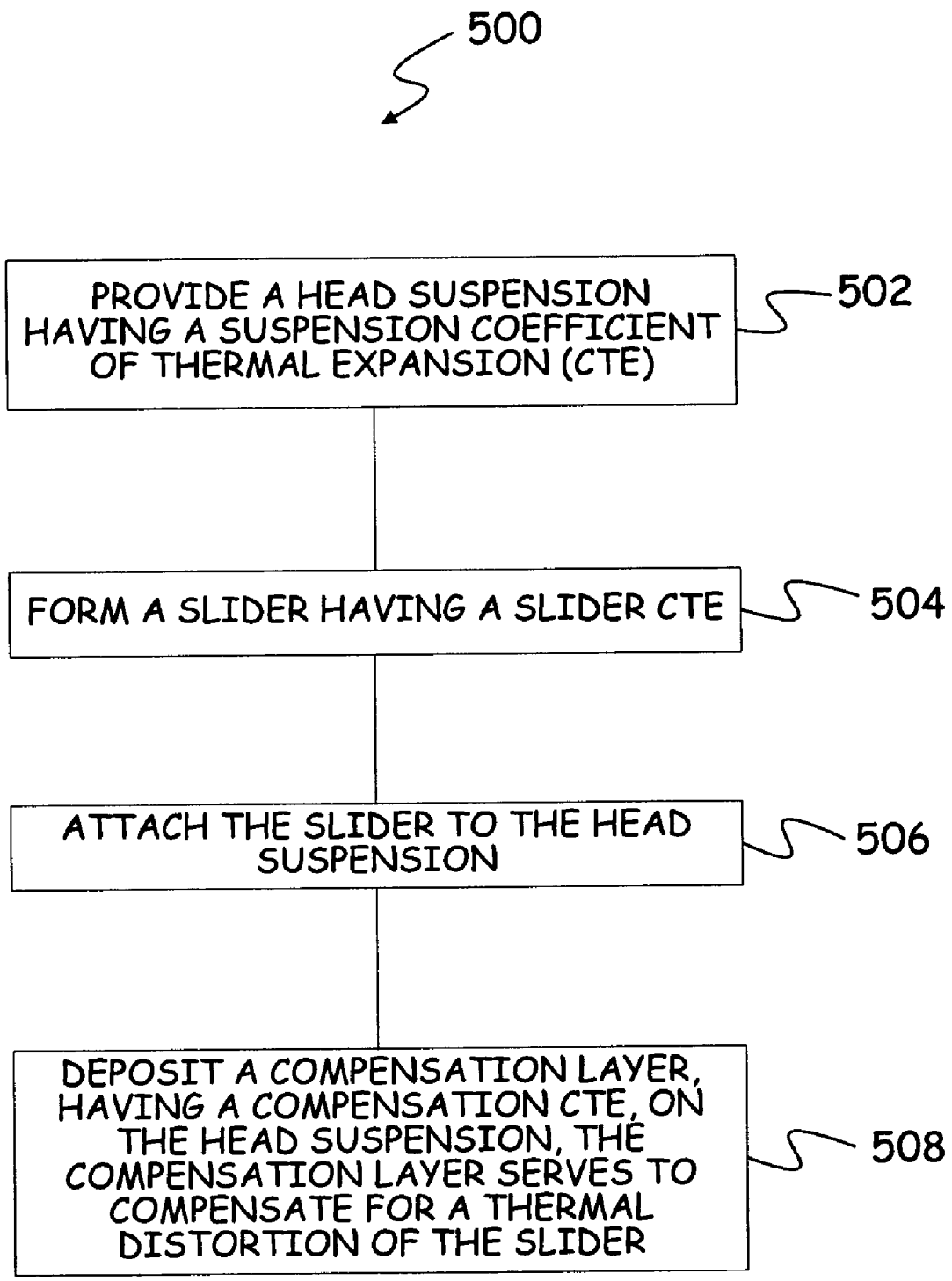
FIG. 5 is a flowchart that illustrates an example method embodiment.
Figure 6:
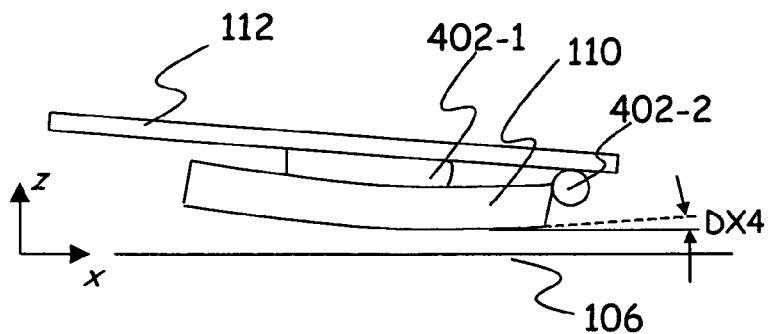
FIG. 6 is a simplified block diagram that illustrates a parameter used to measure a slider air bearing surface (ABS) shape change.

FIG. 5 is a flowchart 500 that illustrates one of the present method embodiments. The example embodiment shown in FIG. 5 relates to a method of forming a HGA. At step 502, a suspension having a suspension CTE is provided. At step 504, a slider having a slider CTE is formed. At step 506, the slider is attached to the suspension. At step 508, a compensation layer, having a compensation CTE, is deposited on the suspension. The compensation layer serves to compensate for a thermal distortion of the slider. In general, different techniques, some of which are set forth above, can be employed to carry out the steps shown in the flowchart of FIG. 5 while maintaining substantially the same functionality without departing from the scope and spirit of the present embodiments. Experimental results are discussed below in connection with FIGS. 6, 7 and 8.

Figure 7:
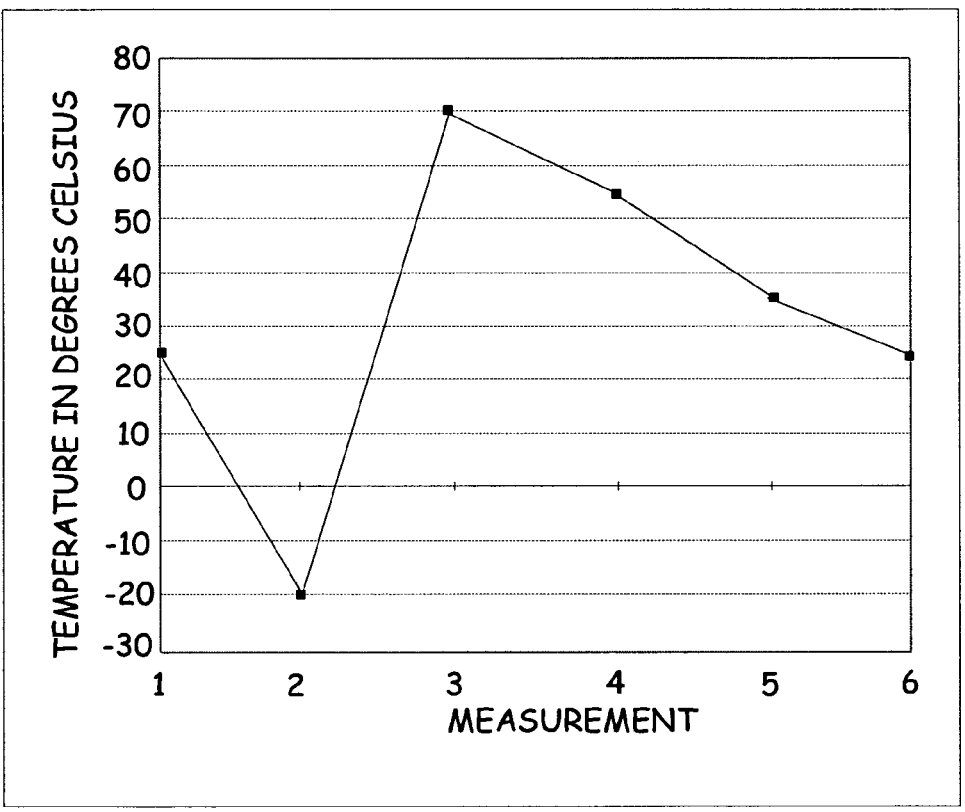
FIGS. 7 and 8 are plots that together show slider ABS shape change variations with environmental temperature changes.

In experiments carried out, the slider ABS shape change with environmental temperature changes was recorded by a parameter "Dx4" (shown in FIG. 6), which is a change in x-direction slope, relative to the disk 106, of the ABS region nearest to ball bonds 402-2 (which also serve as a bonding element in addition to adhesive layer 402-1). The units for parameter Dx4 are micro-radians. In one experiment, a number of Dx4 measurements were carried out for HGAs, with and without SiC compensation layers, at different environmental temperatures. The different environmental temperatures that were used in the experiment are shown in FIG. 7.

Figure 8:
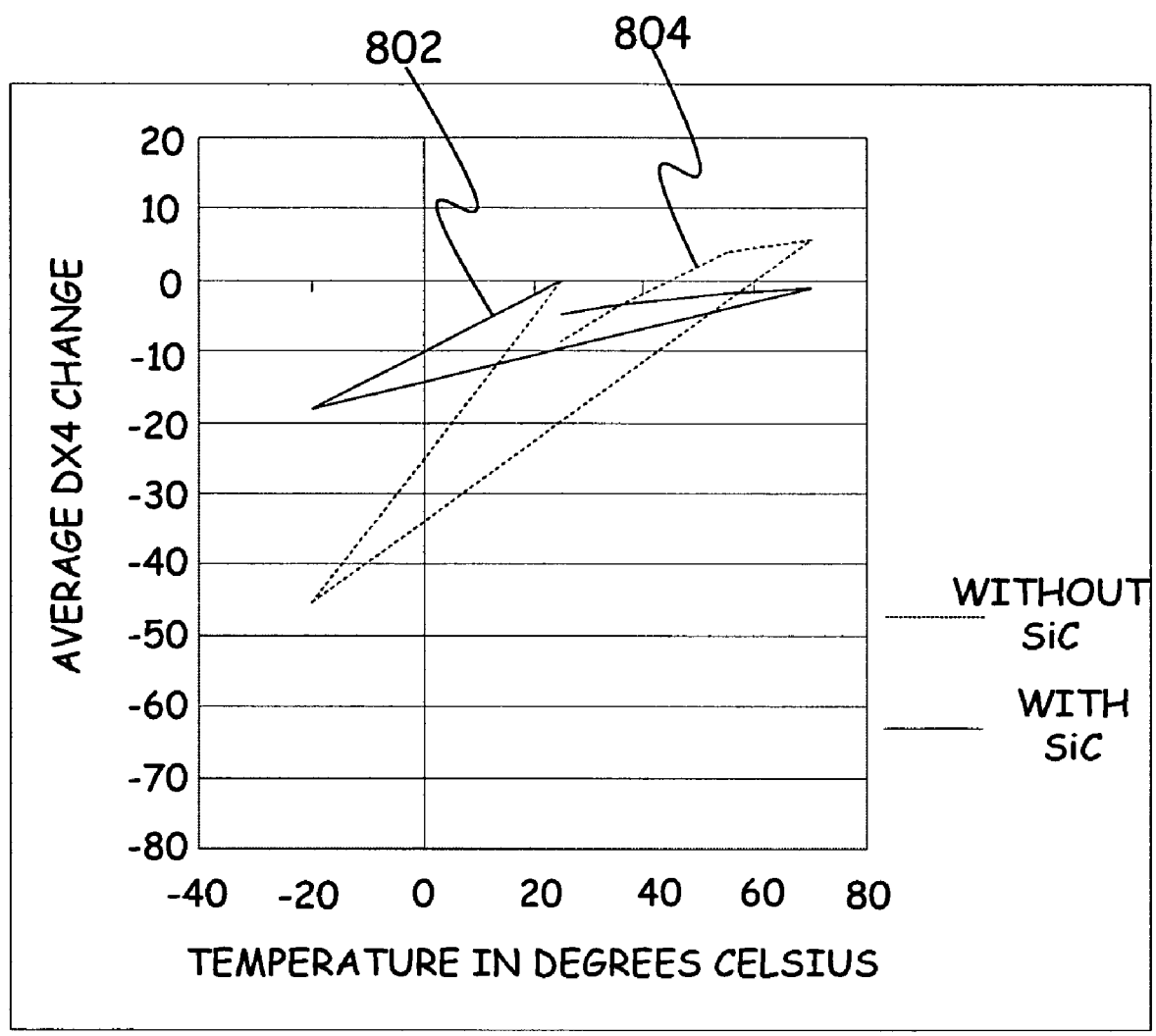

As can be seen in FIG. 8, the change in Dx4 with temperature is significantly reduced on a HGA with a SiC compensation layer, illustrated as plot 802. Plot 804 illustrates results for a HGA without a compensation layer. As can be seen in FIG. 8, the improvements (smaller changes in Dx4 for the HGA with a SiC compensation layer) at −20 C, 55 C, and 70 C are substantial.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the HGA while maintaining substantially the same functionality without departing from the scope and spirit of the present invention. In addition, although the preferred embodiment described herein is directed to a HGA for a disc drive data storage system, it will be appreciated by those skilled in the art that the teachings of the present invention can be applied to any system that utilizes an air bearing slider, without departing from the scope and spirit of the present invention. In should be noted that, although FIG. 4 illustrates a particular type of HGA, the present embodiments apply to any HGA in which an air bearing slider is coupled to a suspension.

What is claimed is:

1. A head gimbal assembly comprising:
   a suspension having a suspension coefficient of thermal expansion (CTE);
   a slider having a slider CTE;
   a bonding element that attaches the slider to the suspension; and
   a compensation layer, located on the suspension, having a compensation CTE, the compensation layer serving to compensate for a thermal distortion of the slider,
   wherein the compensation layer is located on a side of the suspension opposite the slider, and
   wherein the suspension separates the slider from the compensation layer, and wherein the compensation layer is localized within a gimbal portion of the suspension.

2. The head gimbal assembly of claim 1 wherein the suspension comprises a load beam and a gimbal and wherein the compensation layer is located on the gimbal.

3. The head gimbal assembly of claim 1 wherein the compensation CTE is less than the slider CTE.

4. The head gimbal assembly of claim 1 wherein the compensation CTE is less than the suspension CTE.

5. The head gimbal assembly of claim 1 wherein the compensation CTE is less than both the slider CTE and the suspension CTE.

6. The head gimbal assembly of claim 1 wherein the compensation layer comprises silicon carbide.

7. The head gimbal assembly of claim 6 wherein the compensation layer is about 2-5 um thick.

8. The head gimbal assembly of claim 1 wherein the compensation layer comprises zirconium tungstate.

9. A disc drive comprising the head gimbal assembly of claim 1.

10. A method of forming a head gimbal assembly, the method comprising:
    providing a suspension having a suspension CTE;
    forming a slider having a slider CTE;
    attaching the slider to the suspension; and
    depositing a compensation layer, having a compensation CTE, on the suspension, the compensation layer serving to compensate for a thermal distortion of the slider,
    wherein depositing a compensation layer comprises depositing a compensation layer on top of the suspension to provide separation of the slider from the compensation layer and wherein the compensation layer is localized within a gimbal portion of the suspension.

11. The method of claim 10 wherein depositing a compensation layer comprises depositing a compensation layer having a compensation CTE that is less than both the slider CTE and the suspension CTE.

12. The method of claim 10 wherein depositing a compensation layer comprises depositing a silicon carbide compensation layer.

13. The method of claim 12 wherein depositing a compensation layer comprises depositing a silicon carbide compensation layer that is about 2-5 um thick.

14. The method of claim 10 wherein depositing a compensation layer comprises depositing a zirconium tungstate compensation layer.

15. A head gimbal assembly comprising:
    a suspension having a suspension coefficient of thermal expansion (CTE);
    a slider having a slider CTE; and
    a compensation layer, located on the suspension, having a compensation CTE,
    wherein the compensation CTE is less than both the suspension CTE and the slider CTE,
    wherein the compensation layer is located on a side of the suspension opposite the slider, and
    wherein the suspension separates the slider from the compensation layer and wherein the compensation layer is localized within a gimbal portion of the suspension.

16. The head gimbal assembly of claim 15 wherein the compensation layer comprises silicon carbide.

17. The head gimbal assembly of claim 15 wherein the compensation layer comprises zirconium tungstate.

* * * * *

UNITED STATES PATENT AND TRADEMARK OFFICE
CERTIFICATE OF CORRECTION

PATENT NO.       : 7,593,189 B2                                Page 1 of 1
APPLICATION NO.  : 11/479637
DATED            : September 22, 2009
INVENTOR(S)      : Jeremy A. Thurn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Twenty-first Day of September, 2010

David J. Kappos
*Director of the United States Patent and Trademark Office*